US009552012B2

(12) United States Patent
Lu

(10) Patent No.: US 9,552,012 B2
(45) Date of Patent: Jan. 24, 2017

(54) FREQUENCY CALIBRATION METHOD APPLICABLE IN UNIVERSAL SERIAL BUS DEVICE AND RELATED UNIVERSAL SERIAL BUS DEVICE

(71) Applicant: Silicon Motion Inc., Hsinchu County (TW)

(72) Inventor: Liang-Hsuan Lu, Taipei (TW)

(73) Assignee: Silicon Motion Inc., Hsinchu County (TW)

( * ) Notice: Subject to any disclaimer, the term of this patent is extended or adjusted under 35 U.S.C. 154(b) by 118 days.

(21) Appl. No.: 14/551,067

(22) Filed: Nov. 23, 2014

(65) Prior Publication Data

US 2015/0160686 A1    Jun. 11, 2015

(30) Foreign Application Priority Data

Dec. 5, 2013  (TW) .............................. 102144686 A

(51) Int. Cl.
*G06F 1/04* (2006.01)
(52) U.S. Cl.
CPC ...................... *G06F 1/04* (2013.01)
(58) Field of Classification Search
CPC ....................................................... G06F 1/04
USPC ....................................... 713/500, 600, 700
See application file for complete search history.

(56) References Cited

U.S. PATENT DOCUMENTS

| 2011/0016346 | A1* | 1/2011 | Lee ........................... G06F 1/12 713/503 |
| 2012/0119756 | A1 | 5/2012 | Hsieh |
| 2012/0128091 | A1* | 5/2012 | Fountain ............. H04L 25/4908 375/295 |
| 2014/0086297 | A1* | 3/2014 | Shen ................. H04L 25/03878 375/229 |
| 2014/0330995 | A1* | 11/2014 | Levy ................... G06F 13/1694 710/105 |
| 2015/0149808 | A1* | 5/2015 | Lu ............................. G06F 1/08 713/501 |

FOREIGN PATENT DOCUMENTS

CN          1987843 A       6/2007

* cited by examiner

*Primary Examiner* — Kim Huynh
*Assistant Examiner* — Kevin Stewart
(74) *Attorney, Agent, or Firm* — Winston Hsu; Scott Margo

(57) ABSTRACT

A frequency calibration method applicable in a Universal Serial Bus device includes: plugging the Universal Serial Bus device to a Universal Serial Bus host; using the Universal Serial Bus device to receive a polling low frequency periodic signal generated from the Universal Serial Bus host; determining a host type of the Universal Serial Bus host according to the polling low frequency periodic signal; and calibrating a programmable oscillator of the USB device according to a specific clock period corresponding to the host type, to make the programmable oscillator generate a target oscillating signal having a predetermined frequency.

28 Claims, 8 Drawing Sheets

US 9,552,012 B2

FREQUENCY CALIBRATION METHOD APPLICABLE IN UNIVERSAL SERIAL BUS DEVICE AND RELATED UNIVERSAL SERIAL BUS DEVICE

BACKGROUND OF THE INVENTION

1. Field of the Invention

The present invention relates to a frequency calibration method applicable in a Universal Serial Bus (USB) device and the related USB device, and more particularly, to a method of utilizing a polling low frequency periodic signal to calibrate an oscillator of a USB device and a related USB device thereof.

2. Description of the Prior Art

With the development in the technical field of the Universal Serial Bus (USB), the latest data transmission interface has been updated to USB 3.0. The maximum data transmission speed of the USB 3.0 reaches 5 Giga bits per second (Gbps). In other words, the operation clock of USB 3.0 device is at least 2.5 GHz. In a traditional design, a precise inductor capacitor oscillator (LC oscillator) is built in a USB 3.0 device, and the LC oscillator oscillates a reference clock having a precise frequency. Next, a signal synthesizer may be utilized to synthesize a 2.5 GHz operation clock. However, an LC oscillator usually occupies a very large chip area, resulting in an increased production cost of the USB 3.0 device. Hence, how to generate a reference clock having a precise frequency with a lower cost has become an important issue to be solved.

SUMMARY OF THE INVENTION

Hence, one of the objectives of the present invention is to provide a method for calibrating an oscillator in a Universal Serial Bus (USB) device through utilizing a polling low frequency periodic signal and an associated USB device.

According to a first embodiment of the present invention, a frequency calibration method applicable in a USB device is provided. The frequency calibration method includes: coupling the USB device to a USB host; utilizing the USB device to receive a polling low frequency periodic signal from the USB host; determining a host type of the USB host according to the polling low frequency periodic signal; and calibrating a programmable oscillator of the USB device according to a specific clock period corresponding to the host type, to make the programmable oscillator generate a target oscillating signal having a predetermined frequency.

According to a second embodiment of the present invention, the USB device includes a detection circuit, a determining circuit, a programmable oscillator and an adjusting circuit. The detection circuit is arranged for receiving a polling low frequency periodic signal generated from a USB host. The determining circuit is coupled to the detection circuit, and arranged for determining a host type of the USB host according to the polling low frequency periodic signal. The programmable oscillator, arranged for generating an oscillating signal, the adjusting circuit is coupled to the detection circuit, the determining circuit and the programmable oscillator, and arranged for calibrating the programmable oscillator according to a specific clock period corresponding to the host type, to make the programmable oscillator generate a target oscillating signal having a predetermined frequency.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
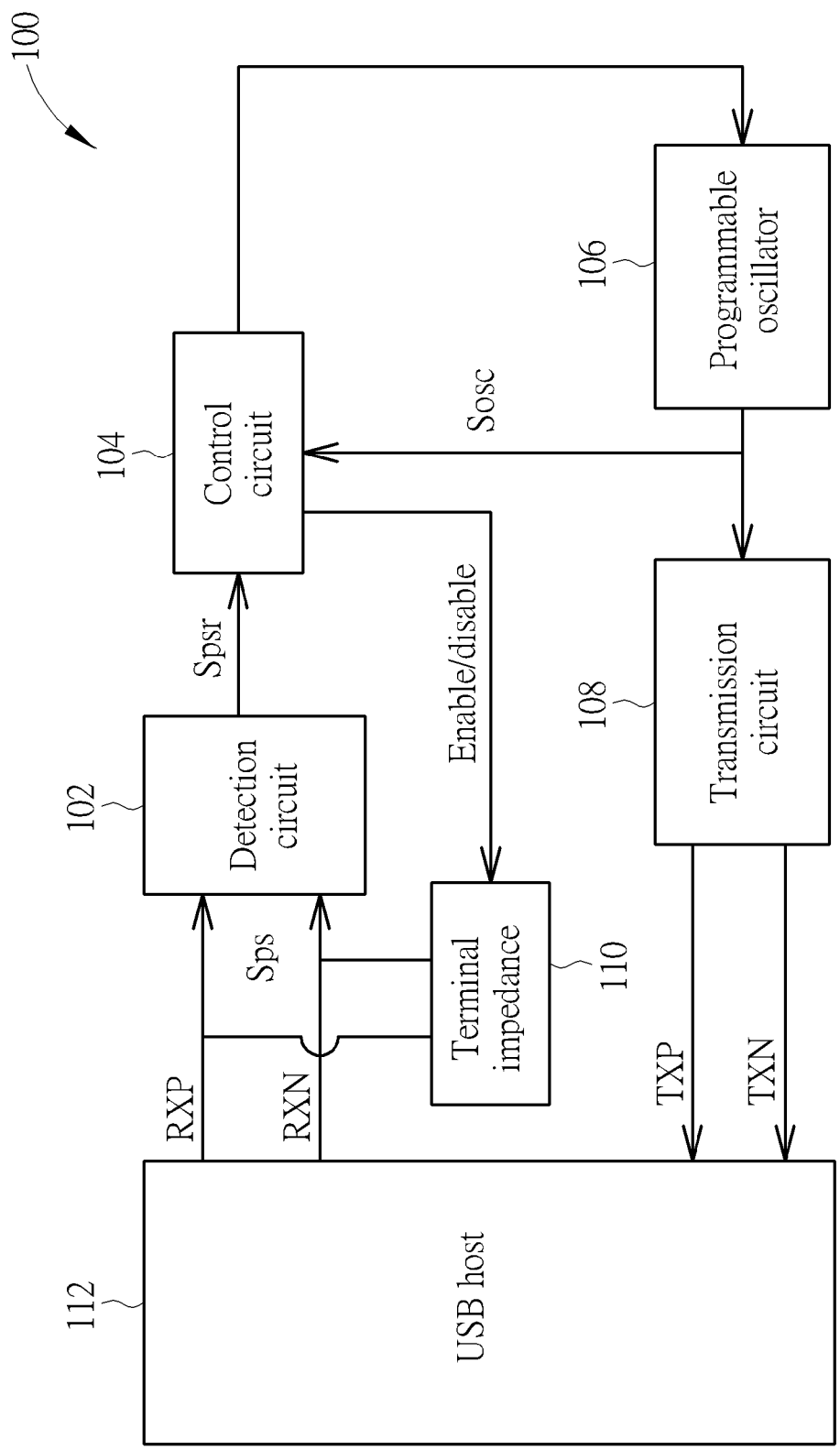
FIG. 1 is a diagram illustrating a USB device according to an embodiment of the present invention.

Please refer to FIG. 1, which is a diagram illustrating a Universal Serial Bus (USB) device 100 according to an embodiment of the present invention. The USB device 100 includes a detection circuit 102, a control circuit 104, a programmable oscillator 106, a transmission circuit 108 and a terminal impedance 110. When the USB device 100 is coupled to a USB host 112, the detection circuit 102 is used to extract a polling low frequency periodic signal (Polling LFPS) Sps from the USB host 100, to generate a detected oscillating signal Spsr having a frequency the same as that of the polling low frequency periodic signal Sps. The programmable oscillator 106 is coupled to the control circuit 104, and used for generating an oscillating signal Sosc according to a control word Sc. The control circuit 104 is coupled to the detection circuit 102 and the programmable oscillator 106, and arranged for calibrating the programmable oscillator 106 of the USB device 100 according to the detected oscillating signal Spsr, to make the programmable oscillator 106 generate a target oscillating signal Sosc_tar having a predetermined frequency Fp. Further, the terminal resistor 110 is coupled to the control circuit 104 and a pair of signal ports RXP and RXN of the detection circuit 102, wherein the signal ports RXP and RXN are used to receive the polling low frequency periodic signal Sps from the USB host 112. The transmission circuit 108 is coupled to the control circuit 104 and a pair of signal ports TXP and TXN, wherein the signals of the USB device 100 are transmitted to the USB host 112 through the signal ports TXP and TXN.

According to an embodiment of the present invention, the USB device 100 is a USB 3.0 device, and the USB host 112 is a USB 3.0 host. However, the present invention is not limited thereto. In another embodiment, the USB host 112 may be a USB 3.0 hub. When the USB device 100 is plugged into the USB host 112 and the USB device 100 and the USB host 112 have not entered an ultra-high data transmission mode (i.e., 5 Gbps) of USB 3.0, the USB device 100 performs a frequency calibration method to calibrate the programmable oscillator 106 in advance, so as to make the programmable oscillator 106 capable of generating the oscillating signal Sosc having the predetermine frequency Fp, wherein the oscillating signal Sosc having the predetermined frequency Fp is used as a reference clock for synthesizing an operation clock (e.g., a 2.5 GHz operation clock) required by the USB device 100 to operate in the ultra-high speed data transmission mode.

Figure 2:
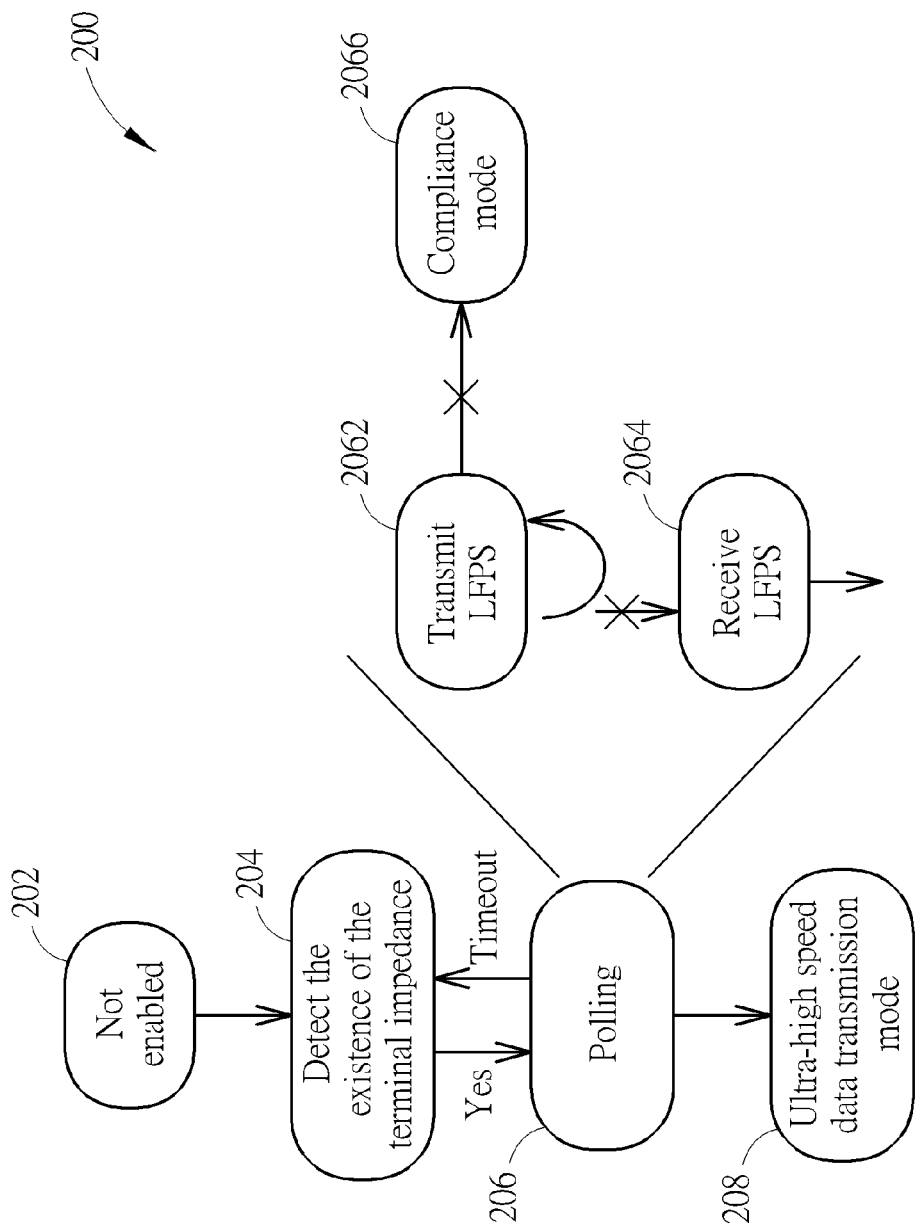
FIG. 2 is a state diagram illustrating partial states of a USB host when a USB device is plugged into the USB host according to an embodiment of the present invention.

Please refer to FIG. 2, which is a state diagram 200 illustrating partial states of the USB host 112 when the USB device 100 is plugged into the USB host 112 according to an embodiment. The state 202 represents that the USB host 112 determines that the USB device 100 has not been enabled. The state 204 represents that the USB host 112 has detected the existence of the terminal impedance 110 of the USB device 100. The state 206 represents that USB host 112 starts to perform polling on the USB device 100. The state 208 represents that the USB host 112 and the USB device 100 have entered the ultra-high speed data transmission mode. In order to make the USB device 100 have sufficient time to calibrate the programmable oscillator 106 before the USB device 100 and the USB host 112 enter the ultra-high speed data transmission mode, the frequency calibration method of the present invention temporarily extends the time of the USB host 112 performing the polling operation upon the USB device 100 in state 206. Specifically, according to FIG. 2 of the present invention, state 206 includes three states, which are states 2062, 2064 and 2066. The state 2062 represents that the USB host 112 transmits the polling low frequency periodic signal Sps to the USB device 100. The state 2064 represents that the USB host 112 receives the polling low frequency periodic signal Sps from the USB device 100. The state 2066 represents that the USB host 112 enters a compliance mode. For retaining the USB host 112 in the state 2062 to continuously transmit the polling low frequency periodic signal Sps to the USB device 100, the frequency calibration method of the present invention avoids the situation that the USB host 112 enters the state 2064 or the situation that the USB host 112 enters the state 2066, until the calibration performed upon the programmable oscillator 106 is completed.

Figure 3:
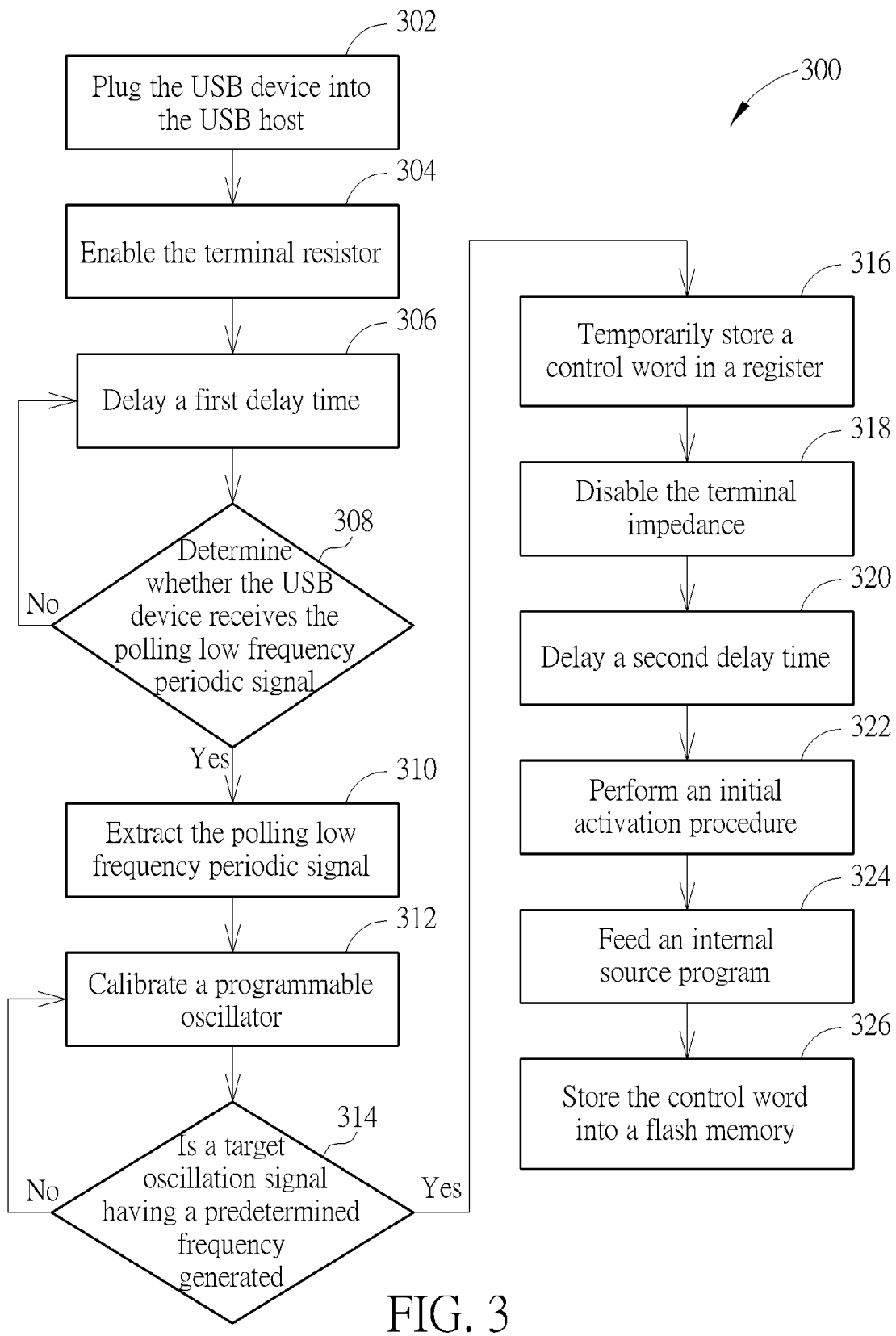
FIG. 3 is a flowchart illustrating a frequency calibration method according to an embodiment of the present invention.

Hence, when the USB device 100 is plugged into the USB host 112, the USB device 100 performs the frequency calibration method 300 shown in FIG. 3 to calibrate the programmable oscillator 106, so as to make the programmable oscillator 106 capable of generating the target oscillating signal Sosc_tar having the predetermined frequency Fp. Please refer to FIG. 3, which is a flowchart illustrating a frequency calibration method 300 of an embodiment of the present invention. Provided that the result is substantially the same, the steps are not required to be executed in the exact order shown in FIG. 3. That is, other steps may be inserted into the steps in FIG. 3. The method 300 includes the following steps.

Step 302: Plug the USB device 100 into the USB host 112.

Step 304: Control the USB device 100 to enable the terminal resistor 110 in the USB device 100, to make the USB host 112 transmit a polling low frequency periodic signal Sps to the USB device 100.

Step 306: Delay a first delay time t1.

Step 308: Determine whether the USB device 100 receives the polling low frequency periodic signal Sps. If yes, go to step 310; otherwise, go to step 306.

Step 310: Utilize the USB device 100 to extract the polling low frequency periodic signal Sps generated from the USB host 112.

Step 312: Calibrate the programmable oscillator 106 in the USB device 100 according to the polling low frequency periodic signal Sps.

Step 314: Determine whether the programmable oscillator 106 generates a target oscillation signal Sosc_tar having a predetermined frequency Fp. If yes, go to step 316; otherwise, go to step 312.

Step 316: Temporarily store a control word Sc in a register, wherein the control word Sc is arranged for controlling the programmable oscillator 106 to generate the oscillation signal Sosc having the predetermined frequency Fp.

Step 318: Control the USB device 100 to disable the terminal impedance 110 of the USB device 100.

Step 320: Delay a second delay time t2.

Step 322: Perform an initial activation procedure of the USB device 100.

Step 324: Feed an internal source program (ISP) from the USB device 100.

Step 326: Store the control word Sc into a flash memory of the USB device 100.

Please note that, in step 304, when the terminal impedance 110 is enabled, the USB host 112 detects the existence of the terminal impedance 110 and accordingly outputs the polling low frequency periodic signal Sps. On the contrary, when the terminal impedance 110 is disabled, the USB host 112 does not detect the existence of the terminal impedance 110, and the USB host 112 determines that the USB device 110 is not correctly coupled to the USB host 112. When the USB host 112 transmits the polling low frequency periodic signal Sps to the USB device 100, the control circuit 104 controls the detection circuit 102 to wait for the first delay time t1, and then detects the polling low frequency periodic signal Sps from the USB host 112. This is because when the USB host 112 detects the existence of the terminal impedance 110, the USB host 112 does not necessarily transmit the polling low frequency periodic signal Sps immediately. According to the USB 3.0 specification, when the USB host 112 detects the existence of the terminal impedance 110, the USB host 112 must transmit the low frequency periodic signal Sps in 50 ms (millisecond). Hence, through proper designs, when the first delay time t1 is reached, the detection circuit 102 of the USB device 100 should have received the polling low frequency periodic signal Sps generated from the USB host 112.

Figure 4:
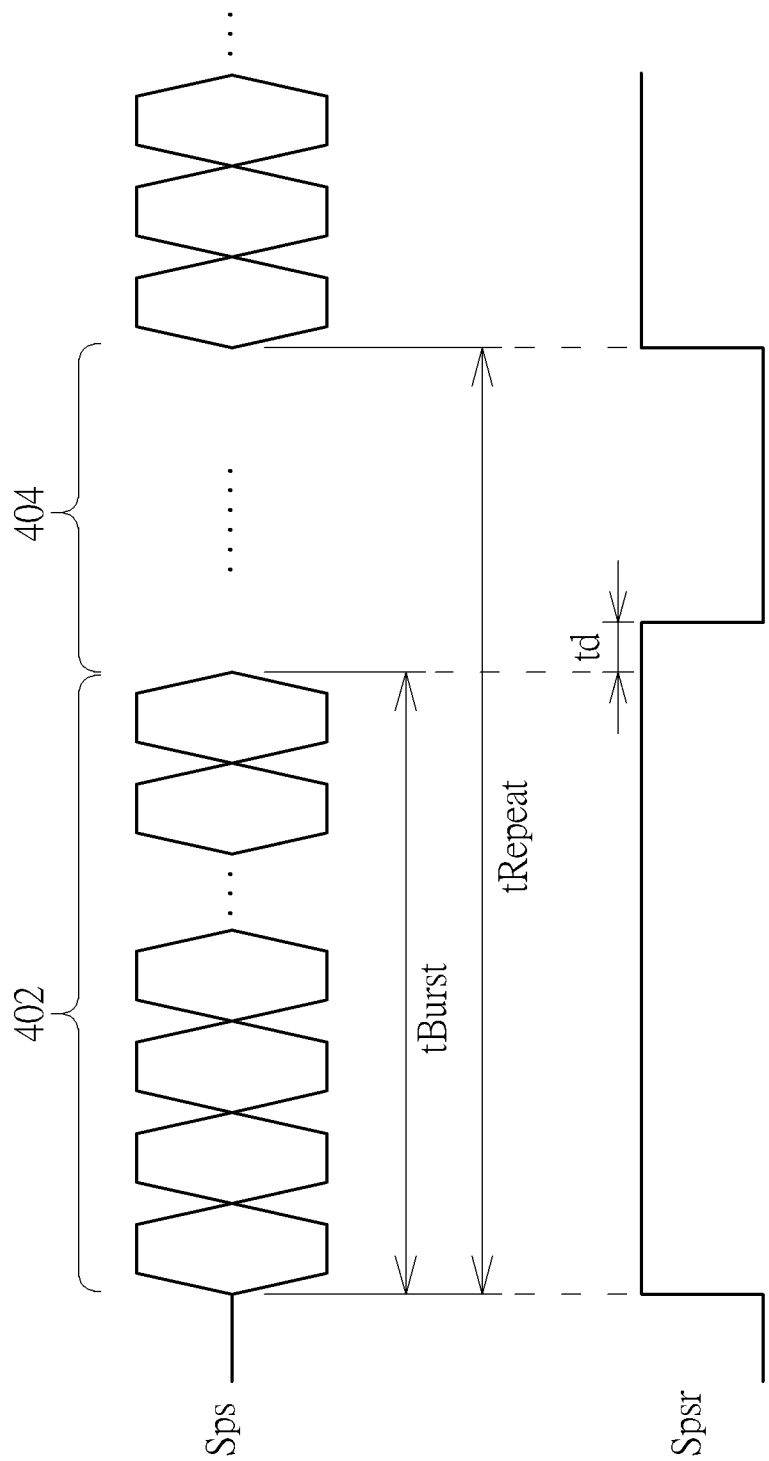
FIG. 4 is a timing diagram illustrating a low frequency periodic signal and a detected oscillating signal according to an embodiment of the present invention.

Please refer to FIG. 4, which is a timing diagram illustrating a polling low frequency periodic signal Sps and a detected oscillating signal Spsr according to an embodiment of the present invention. The polling low frequency periodic signal Sps is a periodic signal having an approximate 10% duty cycle and an approximate 100 KHz frequency. Specifically, the polling low frequency periodic signal Sps is divided into two parts, i.e., the first part 402 and the second part 404. The first part 402 includes a high frequency periodic signal, where each period/cycle of the high frequency signal is about 10 ns-100 ns. The second part 404 is an idle time having no signal. The standardized lasting time tBurst of the first part 402 is 1 µs (microsecond), where the range allowed by the USB 3.0 specification is 0.6 µs-1.4 µs. Besides, the standardized lasting time tRepeat of the second part 404 is 9 µs, where the range allowed by the USB 3.0 specification is 6 µs-14 µs. Although the standardized lasting time tBurst of the first part 402 and the standardized lasting time tRepeat of the second part 404 may be freely set by values in the allowed ranges, the standardized lasting time tBurst of the first part 402 is usually fixed (approximately 1 µs), and the ratio of the standardized lasting time tBurst of the first part 402 to the standardized lasting time tRepeat of the second part 404 is usually fixed as well. In other words, the duty cycle of the polling low frequency periodic signal Sps is usually fixed at 10%, and the frequency thereof is usually fixed at 100 KHz. Hence, the USB device 100 may utilize these characteristics of the polling low frequency periodic signal Sps, to identify and extract the polling low frequency periodic signal Sps, and then refer to the extracted polling low frequency periodic signal Sps to generate the detected oscillating signal Spsr having a frequency the same as that of the polling low frequency periodic signal Sps to calibrate the programmable oscillator 106, thus making the programmable oscillator 106 generate the target oscillating signal Sosc_tar having the predetermined frequency Fp.

Specifically, the detection circuit 102 extracts the detected oscillating signal Spsr which is substantially identical to the polling low frequency periodic signal Sps. The control circuit 104 reads the detected oscillating signal Spsr, and outputs the control word Sc to adjust the oscillating signal Sosc of the programmable circuit 106. Please note that, it may be seen from the embodiment of FIG. 1 that the control circuit 104 and the programmable oscillator 106 are coupled in a feedback fashion. In other words, the control circuit 104 outputs different control words Sc to adjust the programmable oscillator 106 and receives the corresponding oscillating signals Sosc to calculate the oscillating frequency values thereof, until the oscillating frequency is calibrated to the predetermined frequency Fp. Hence, in order to make the control circuit 104 have sufficient time to calibrate the programmable circuit 106, the control circuit 104 of the present invention may also control the transmission circuit 108 to stop generating a corresponding low frequency periodic signal to the USB host 112, to thereby make the USB host 112 continuously generate the polling low frequency periodic signal Sps to the USB device 100. In an embodiment, when the USB device 100 receives the polling low frequency periodic signal Sps from the USB host 112, the control circuit 104 controls the transmission circuit 108 to continuously generate a predetermined signal having a frequency higher than that of the polling low frequency periodic signal Sps to the USB device 100, so as to make the USB host 112 continuously generate the polling low frequency periodic signal Sps to the USB device 100. For example, the predetermined signal may be a high frequency signal having a period of approximate 10 ns-100 ns.

In another embodiment of the present invention, when the USB device 100 receives the polling low frequency periodic signal Sps form the USB host 112, the control circuit 104 controls the transmission circuit 108 to stop generating a normal response signal to the USB host 112, so as to make the USB host 112 continuously generate the polling low frequency periodic signal Sps to the USB device 100.

Further, in another embodiment of the present invention, when the USB device 100 receives the polling low frequency periodic signal Sps from the USB host 112, the control circuit 104 controls the transmission circuit 108 to generate a predetermined signal different from the polling low frequency periodic signal Sps to the USB host 112, so as to make the USB host 112 continuously generate the polling low frequency periodic signal Sps to the USB device 100.

In step 316, when the programmable oscillator 106 is already calibrated to generate the target oscillating signal Sosc_tar having the predetermined frequency Fp, the control circuit 104 temporarily stores the corresponding control word Sc into a register. At the same time, the control circuit 104 disables the terminal impedance 110 of the USB device 100, such that the USB host 112 determines that the USB device 100 is not correctly coupled to the USB host 112 (step 318).

Next, the control circuit 104 enters an initializing activation procedure of the USB device 100 (step 322) after the second delay time t2 has elapsed (step 320). In the initializing activation procedure, the control circuit 104 of the USB device 100 feeds an internal source program (ISP) to initialize the USB device 100 (step 324). Please note that, the ISP may be firmware stored in a read-only memory (ROM).

Next, in step 326, when the USB device 100 completes the initial activation procedure, the control circuit 104 stores the control word Sc previously stored in the register into a flash memory. Hence, after the USB device 100 completes the initial activation procedure, the flash memory has already stored the control word Sc used to control the programmable oscillator 106 to generate the target oscillating signal Sosc_tar having the predetermined frequency Fp. Thereafter, if the USB device 100 is coupled to the USB host 112 again, the control circuit 104 no longer has to calibrate the programmable oscillator 106, and may directly read the control word Sc in the flash memory instead. In this way, the USB device 100 of the present invention is capable of generating a reference clock having a precise frequency in a low-cost manner.

Please note that, in step 316, after the control circuit 104 temporarily stores the corresponding control word Sc into the register, the control circuit 104 does not need to disable the terminal impedance 110 of the USB device 100. Specifically, in another embodiment of the present invention, when the control circuit 104 calculates the corresponding control word Sc and then temporarily stores the control word Sc into the register, the control circuit 104 further enables the terminal impedance 110 of the USB device 100 continuously, and controls the USB device 100 to generate another polling low frequency periodic signal Sps to the USB host 112. In this way, when the USB host 112 receives the polling low frequency periodic signal Sps from the USB device 100, the USB host 112 enters the state 2064 shown in FIG. 2. Then, the USB host 112 and the USB device 100 directly enter the ultra-high data transmission mode, i.e., the state 208 shown in FIG. 2.

Figure 5:
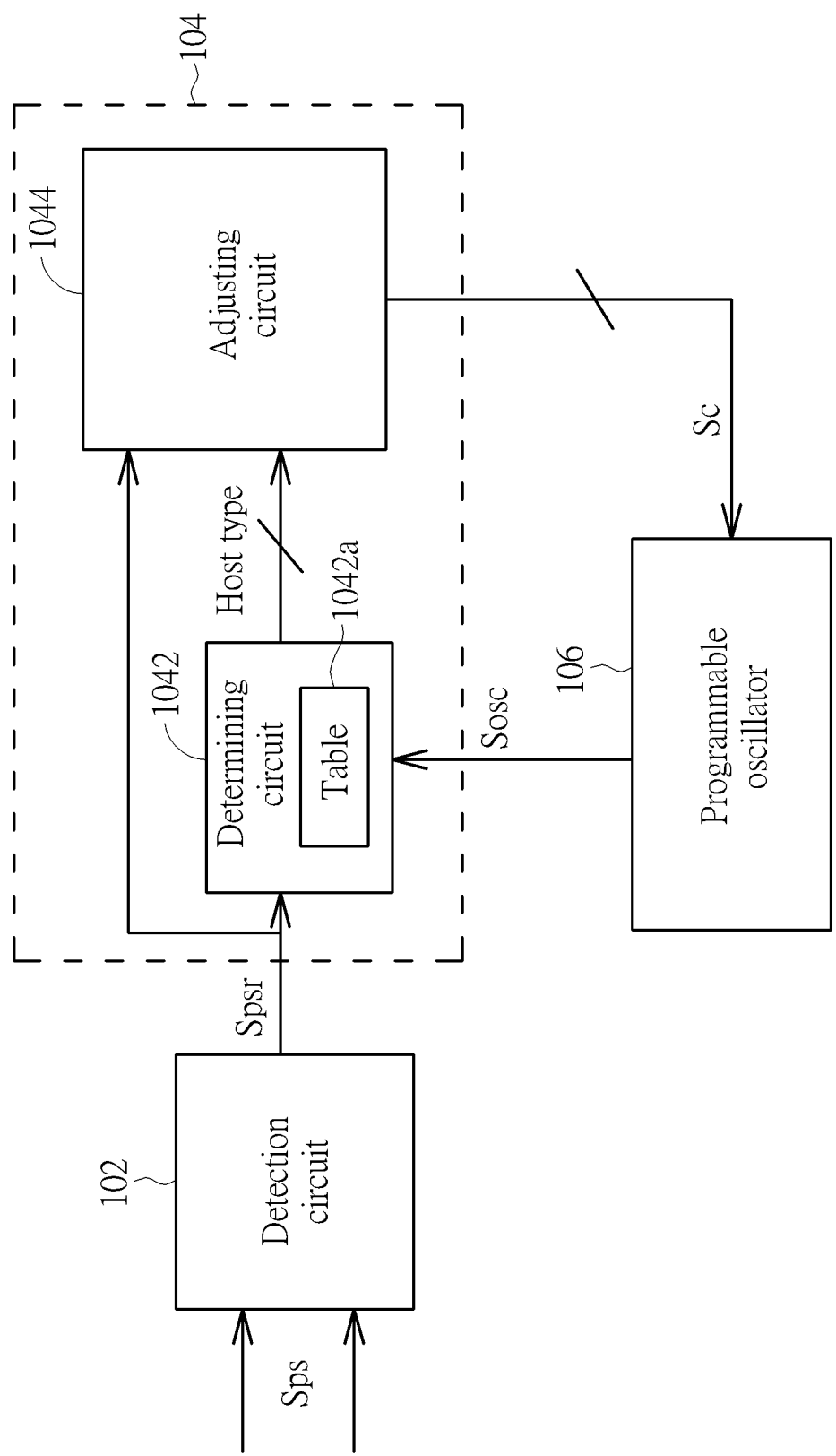
FIG. 5 is a diagram illustrating a control circuit according to a first embodiment of the present invention.

Please refer to FIG. 5, which is a diagram illustrating a control circuit 104 according to a first embodiment of the present invention. The control circuit 104 includes a determining circuit 1042 and an adjusting circuit 1044. Please note that, in order to describe the technical features of the control circuit 104 more clearly, FIG. 4 further depicts the detection circuit 102 and the programmable circuit 106. The determining circuit 1042 is coupled to the detection circuit 102, and used for determining the host type of the USB host 112 according to the polling low frequency periodic signal Sps. The adjusting circuit 1044 is coupled to the detection circuit 102, the determining circuit 1042 and the programmable oscillator 106, and used for calibrating the programmable circuit 106 according to a specific clock period Tp corresponding to the host type, to make the programmable oscillator 106 generate the target oscillating signal Sosc_tar having the predetermined frequency Fp.

Specifically, in this embodiment, the determining circuit 1042 is used for: adjusting the oscillating signal Sosc of the programmable circuit 106 to serve as a coarsely-adjusted oscillating signal Scoarse according to a pulse width time (which is the standardized lasting time tBurst of the first part 402 as shown in FIG. 4, and is denoted as "tBurst" in the following) of the low frequency clock signal Spsr; utilizing the coarsely-adjusted oscillating signal Scoarse of the programmable oscillator 106 to calculate a pulse period (which is the standardized lasting time tRepeat of the second part 404 as shown in FIG. 4, and denoted as "tRepeat" in the following) of the low frequency clock signal Spsr; calculating a ratio R of the pulse period tRepeat and the pulse width time tBurst; and determining the host type of the USB host 112 according to the ratio R. In addition, the determining circuit 1042 is further used for: counting a period number Nburst of the oscillating signal Sosc during the pulse width time tBurst of the low frequency clock signal Spsr, and determining whether the period number Nburst is equal to a first predetermined period number Np1; keeping adjusting the programmable oscillator 106 until the period number Nburst of the oscillating signal Sosc is equal to the predetermined period number Np1; and treating the oscillating signal Sosc corresponding to the first predetermined period number Np1 as the coarsely-adjusted oscillating signal Scoarse. Moreover, the determining circuit 1042 is further used for: counting a period number Nrepeat of the coarsely-adjusted oscillating signal Scoarse during the pulse period tRepeat of the low frequency clock signal Spsr, so that the period number Nrepeat of the coarsely-adjusted oscillating signal Scoarse corresponds to the pulse period tRepeat of the low frequency clock signal Spsr. Hence, the determining circuit 1042 may be used to calculate the ratio R of the pulse period tRepeat and the pulse width time tBurst according to the period numbers Nburst and Nrepeat.

Further, when the determining circuit 1042 determines the host type of the determining circuit 1042, the adjusting circuit 1044 is used for: counting a period number Nosc of the oscillating signal Sosc during the specific clock period Tp, and determining whether the period number Nosc is equal to a second predetermined period number Np2; keeping adjusting the programmable oscillator 106 until the period number Nosc of the oscillating signal Sosc is equal to the second predetermined period number Np2; and treating the oscillating Sosc signal corresponding to the second predetermined period number Np2 as the target oscillating signal Sosc_tar.

Hence, in order to complete the above operations, the determining circuit 1042 further stores a table 1042a. The table 1042a is arranged for storing a plurality of candidate host types, and further stores a plurality of pulse width times corresponding to the candidate host types, a plurality of clock periods corresponding to the candidate host types, a plurality of candidate ratios (i.e., the ratio of the pulse period tRepeat and the pulse width time tBurst) corresponding to the candidate host types, and a plurality of predetermined period numbers of the polling low frequency periodic signals Sps corresponding to the candidate host types. The table 1042a is shown as the following table 1.

TABLE 1

| Host type | Pulse width time tBurst (us) | Pulse period tRepeat (us) | Candidate ratio R | Second predetermined period number Np2 |
|---|---|---|---|---|
| Type 1 | 1.02 | 10.667 | 10.40625 | 256 |
| Type 2 | 1.02 | 10 | 9.8125 | 240 |
| Type 3 | 1.02 | 10.28 | 10 | 237 |
| Type 4 | 1.02 | 11 | 10.8125 | 260 |

Please note that, in order to more clearly describe the spirit of the present invention, in this embodiment, the predetermined frequency Fp of the target oscillating signal Sosc_tar of this embodiment is selected as 24 MHz, and the host type of the USB host 112 is categorized into one of the above four types in Table 1. However, this is not a limitation to the present invention.

Further, in order to more precisely calibrate the programmable oscillator 106, the present invention further adds a predetermined delay time Td (i.e., 0.02 μs) to the clock width time tBurst (i.e., 1 μs) of the low frequency clock signal Spsr, to generate an updated pulse width time (i.e., 1.02 μs), and treats the updated pulse width time as the pulse width time tBurst of the low frequency clock signal Spsr generated according to the polling low frequency periodic signal Sps. Specifically, as shown in FIG. 4, when the detection circuit t102 extracts the corresponding detected oscillating signal Spsr according to the polling low frequency periodic signal Sps, the first part 402 of the detected oscillating signal Spsr has a delay time (i.e., the predetermined delay time Td). Hence, concerning the affect brought by the delay time, the determining circuit 1042 and the adjusting circuit 1044 of the present invention treat the updated pulse width time as the lasting time tBurst of the polling low frequency periodic signal Sps. In other words, the pulse width time of the low frequency clock signal Spsr is substantially the pulse width time of the polling low frequency periodic signal Sps plus a predetermined delay time Td.

Hence, when the determining circuit 1042 receives the low frequency clock signal Spsr, the determining circuit 1042 counts the period number Nbusrt of the oscillating signal Sosc during the pulse width time tBurst of the low frequency clock signal Spsr and keeps adjusting the programmable circuit 106, until the period number Nbusrt of the oscillating signal Sosc during the pulse width time tBurst is equal to the first predetermined period number Np1. Please note that, in the present invention, the programmable circuit 106 may be adjusted directly by the determining circuit 1042, or may be adjusted through the adjusting circuit 1044. Since the pulse width time tBurst is fixed (i.e., at 1.02 μs), when the period number Nbusrt of the oscillating signal Sosc during the pulse width time tBurst is equal to the first predetermine period number Np1, the oscillating signal Sosc will be an oscillating signal having a predetermined frequency, i.e., the coarsely-adjusted oscillating signal Scoarse. Please note that, in this embodiment, the first predetermined number Np1 is about 25.

Next, the frequency of the coarsely-adjusted oscillating signal Scoarse generated by the programmable oscillator 106 is about 24 MHz, and the determining circuit 1042 calculates the period number Nrepeat of the coarsely-adjusted oscillating signal Scoarse during the pulse period tRepeat of the low frequency clock signal Spsr. Then, the determining circuit 1042 may calculate the ratio of the period number Nrepeat and the period number Nburst (i.e., Nrepeat/Nburst), so as to obtain the ratio R of the pulse period tRepeat and pulse width time tBurst (i.e., tRepeat/tBurst). The ratio R of the pulse period tRepeat and pulse width time tBurst is used to obtain the corresponding host type through Table 1.

When the host type of the USB host 112 is found, it means that the pulse period tRepeat of the low frequency clock signal Spsr generated by USB host 112 (i.e., the specific clock period Tp) can be determined based on Table 1. Then, the adjusting circuit 1044 counts the period number Nosc of the oscillating signal Sosc (which is the coarsely-adjusted oscillating signal Scoarse in the beginning) during the specific clock period Tp, and determines whether the period number Nosc is equal to the second predetermined period number Np2 recorded in Table 1. Then, the adjusting circuit 1044 keeps adjusting the programmable oscillator 106, until the period number Nosc of the oscillating signal Sosc is equal to the second predetermined period number Np2. After the host type is determined, the specific clock period Tp thereof is a fixed period (e.g. the pulse period tRepeat of the host type Type 1 that is 10.667 μs). Hence, when the period number Nosc of the oscillating signal Sosc is equal to the second predetermined period number Np2, the oscillating signal Sosc will be an oscillating signal having a predetermined frequency, i.e., the target oscillating signal Sosc_tar having the 24 MHz frequency.

Please note that, in Table 1, those second predetermined period numbers Np2 are set based on one pulse period tRepeat. However, this is not a limitation to the present invention. In order to obtain a more precise target oscillating signal Sosc_tar, the second predetermined period number NP2 may be set as the period number of the oscillating signal Sosc that is counted during a period that is multiple times as large as the pulse period tRepeat. For example, the second predetermined period number Np2 of the oscillating signal Sosc may be counted during a period that is three times as large as the pulse period tRepeat (i.e., 3*tRepeat), as shown in the Column 5 of the following Table 2.

TABLE 2

| Host type | Pulse width time tBurst (μs) | Pulse period tRepeat (μs) | Candidate ratio R | Second predetermined period number Np2 |
|---|---|---|---|---|
| Type 1 | 1.02 | 10.667 | 10.40625 | 768 |
| Type 2 | 1.02 | 10 | 9.8125 | 720 |
| Type 3 | 1.02 | 10.28 | 10 | 710 |
| Type 4 | 1.02 | 11 | 10.8125 | 779 |

Please note that, the purpose of setting the second predetermined period number Np2 as the period number of the oscillating signal Sosc counted in a period that is multiple times as large as the pulse period tRepeat is to obtain a more precise target oscillating signal Sosc_tar. The rest calculations are similar to those in the embodiment of Table 1, and thus the detailed operations thereof are omitted here for brevity.

Figure 6:
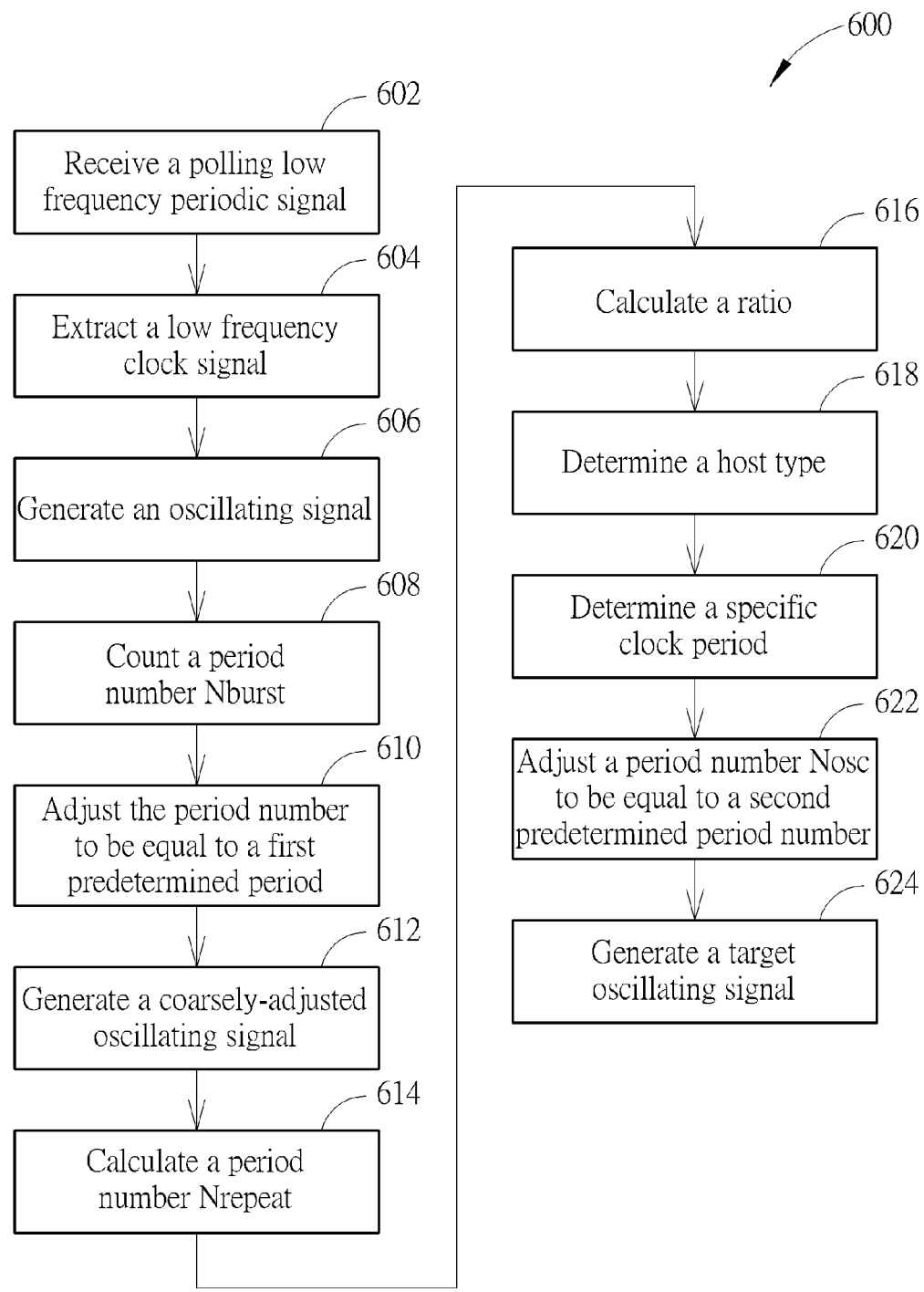
FIG. 6 is a flowchart illustrating a frequency calibration method according to a first embodiment of the present invention.

In short, the operation procedure of the control circuit 104 shown in FIG. 5 may be represented by the flowchart shown in FIG. 6. Please refer to FIG. 6, which is a flowchart illustrating a frequency calibration method 600 according to a first embodiment of the present invention. Provided that the result is substantially the same, the steps are not required to be executed in the exact order shown in FIG. 6. That is, other steps may be inserted into the steps in FIG. 6. The method 600 includes the following steps.

Step 602: Receive a polling low frequency periodic signal Sps from the USB host 112.

Step 604: Extract a low frequency clock signal Spsr corresponding to the polling low frequency periodic signal Sps.

Step 606: Control the programmable circuit 106 to generate the oscillating signal Sosc.

Step 608: Count the period number Nburst of the oscillating signal Sosc during the pulse width time tBurst of the low frequency clock signal Spsr.

Step 610: Keep adjusting the programmable circuit 106 until the period number Nburst of the oscillating signal Sosc is equal to the first predetermined period Np1.

Step 612: Treat the oscillating signal Sosc corresponding to the first predetermined period number Np1 as a coarsely-adjusted oscillating signal Scoarse.

Step 614: Calculate the period number Nrepeat of the coarsely-adjusted oscillating signal Scoarse during the pulse period tRepeat of the low frequency clock signal Spsr.

Step 616: Calculate the ratio R of the pulse period tRepeat and the pulse width time tBurst.

Step 618: Determine the host type of the USB host 112 according to the ratio R.

Step 620: Determine a specific clock period Tp of the USB host 112 according to the host type of the USB host 112.

Step 622: Count the period number Nosc of the oscillating signal Sosc during the specific clock period Tp and keep adjusting the programmable oscillator 106, until the period number Nosc of the oscillating signal Sosc is equal to the second predetermined period number Np2.

Step 624: Treat the oscillating signal Sosc of the second predetermined number Np2 as the target oscillating signal Sosc_tar.

Please note that, when the control circuit 104 calibrates the programmable circuit 106 to generate a precise target oscillating signal Sosc_tar, the control circuit 104 stores the corresponding control word Sc. After that, if the USB device 100 is coupled to the USB host 112 again, the control circuit 104 will no longer need to calibrate the programmable circuit 106, and may directly read the stored control word Sc. In this way, the USB device 100 of the present invention is capable of generating a reference clock having a precise frequency in a low-cost manner.

Figure 7:
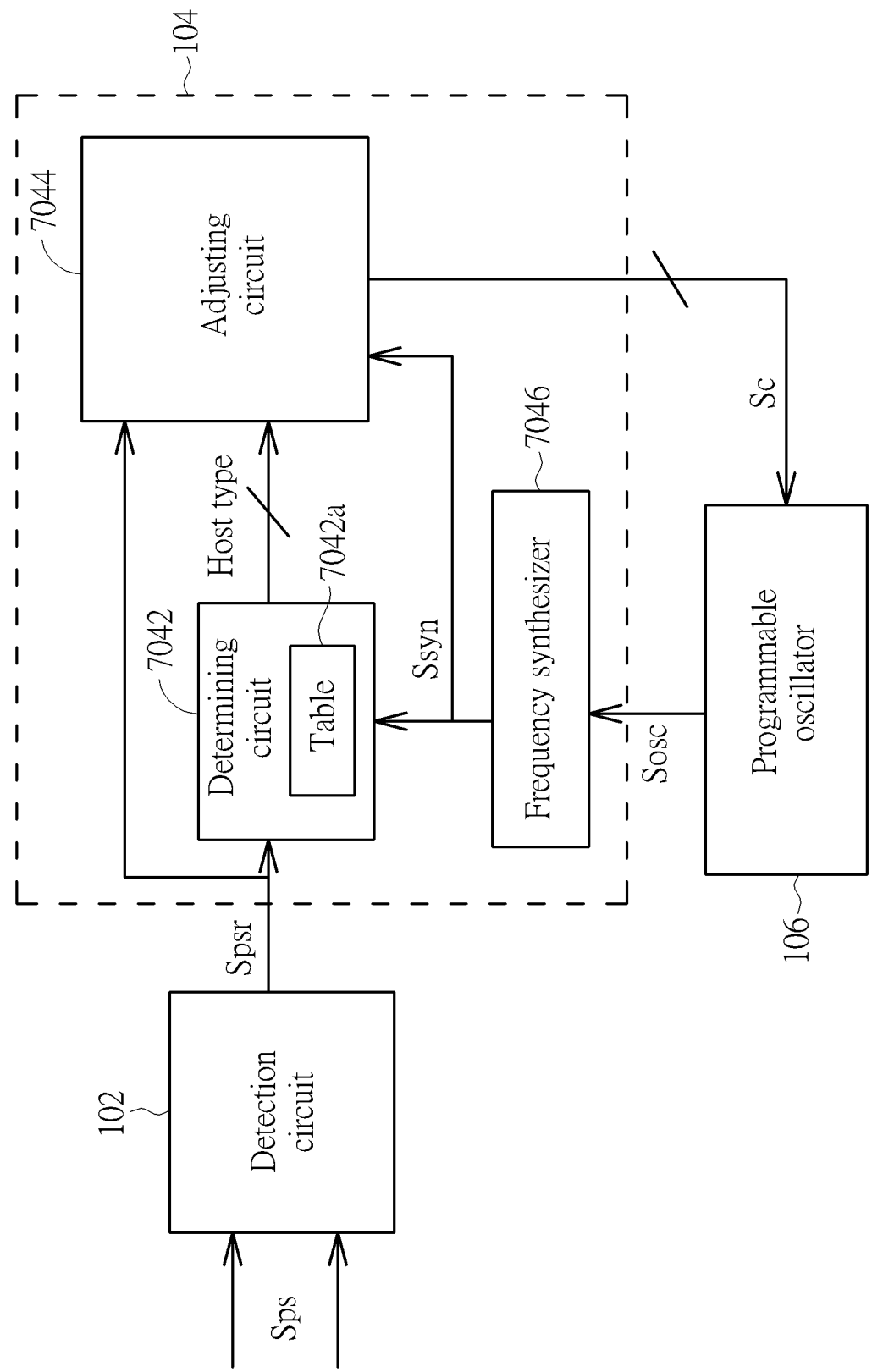
FIG. 7 is a diagram illustrating a control circuit according to a second embodiment of the present invention.

Please refer to FIG. 7, which is a diagram illustrating a control circuit 104 according to a second embodiment of the present invention. The control circuit 104 includes a determining circuit 7042, an adjusting circuit 7044 and a frequency synthesizer 7046. Please note that, in order to describe the technical features of the control circuit 104 more clearly, FIG. 7 further depicts the detection circuit 102 and the programmable circuit 106. The determining circuit 7042 is coupled to the detection circuit 102, and used for determining the host type of the USB host 112 according to the polling low frequency periodic signal Sps. The adjusting circuit 7044 is coupled to the detection circuit 102, the determining circuit 7042, the programmable oscillator 106 and the frequency synthesizer 7046, and used for calibrating the programmable circuit 106 according to a specific clock period Tp corresponding to the host type of the USB host 112, to make the programmable oscillator 106 generate the target oscillating signal Sosc_tar having the predetermined frequency Fp. The frequency synthesizer 7046 is used for performing a frequency synthesizing operation upon the oscillating signal Sosc to generate a synthesized oscillating signal Ssyn. Further, the detection circuit 102 further extracts a low frequency clock signal Spsr corresponding to the polling low frequency periodic signal Sps, and the determining circuit 102 is used for: adjusting the oscillating signal Sosc according to a multi-fold pulse width time that is multiple (M) times the pulse width time (i.e. M*tBurst) to adjust the synthesized oscillating signal Ssyn as a coarsely-adjusted synthesized oscillating signal Ssyn_coarse; utilizing the coarsely-adjusted synthesized oscillating signal Ssyn_coarse to calculate a multi-fold pulse period that is multiple times (M) times the pulse period of the low frequency clock signal Spsr (i.e. M*tRepeat); calculating a ratio R of the multi-fold pulse period M*tRepeat and the multi-fold pulse width time M*tBurst; and determining the host type of the USB host 112 according to the ratio R.

Specifically, in this embodiment, the determining circuit 7042 is further used for: adding a predetermined delay time Td to each pulse width time tBurst in the multi-fold pulse width time M*tBurst to generate an updated multi-fold pulse width time M*(tBurst+Td), and treating the updated multi-fold pulse width time M*(tBurst+Td) as the multi-fold pulse width time M*Burst of the low frequency clock signal Spsr. In other words, each pulse width time in the multi-fold pulse width time M*Burst of the low frequency clock signal Spsr is substantially equal to a pulse width time of the polling low frequency periodic signal Sps plus a predetermined delay time Td. Please note that, the purposes and reasons of performing the above operation of this embodiment have been disclosed in the first embodiment, and thus are omitted here for brevity.

Further, the determining circuit 7042 is used for: counting a period number N_mtburst of the synthesized oscillating signal Ssyn during the multi-fold pulse width time M*tBurst of the low frequency clock signal Spsr, and determining whether the period number N_mtburst is equal to a first predetermined period number N_mp1; keeping adjusting the programmable oscillator 106 until the period number N_mtburst of the synthesized oscillating signal Ssyn is equal to the predetermined period number N_mp1; and treating the synthesized oscillating signal Ssyn corresponding to the first predetermined period number N_mp1 as the coarsely-adjusted synthesized oscillating signal Ssyn_coarse. The determining circuit 7042 is further used for: counting a period number N_mtrepeat of the coarsely-adjusted synthesized oscillating signal Ssyn_coarse during the multi-fold pulse period M*tRepeat of the low frequency clock signal Spsr; and calculating the ratio R of the multi-fold pulse period M*tRepeat and the multi-fold pulse width time M*tBurst, to thereby determine the host type of the USB host 112.

Further, after the determining circuit 7042 determines the host type of the USB host 112, the adjusting circuit 7044 is used for: determining a specific clock period Tp corresponding to the USB host 112 from a plurality of candidate clock periods according to the host type, and calculating a multi-fold clock period that is multiple times (N) of the clock period of the specific clock period Tp (i.e., N*Tp); counting a period number Nosc1 of the synthesized oscillating signal Ssyn during the multi-fold clock period N*Tp, and determining whether the period number Nosc1 is equal to a second predetermined period number N_mp2; keep adjusting the oscillating signal Sosc of the programmable circuit 106, until the period number Nosc1 of the corresponding synthesized oscillating signal Ssyn is equal to the second predetermined period number N_mp2; and treating the oscillating signal Sosc corresponding to the second predetermined period number N_mp2 as the target oscillating signal Sosc_tar.

Hence, in order to complete the above operations, the determining circuit 7042 further stores a table 7042a which is arranged for storing a plurality of candidate host types and further storing a plurality of pulse width times corresponding to the candidate host types, a plurality of clock periods corresponding to the candidate host types, a plurality of candidate ratios (i.e., the ratio R of the multi-fold clock pulse period M*tRepeat and the multi-fold period width time M*tBurst) and a plurality of second predetermined periods corresponding to the candidate host types, as shown in the following Table 3.

TABLE 3

| Host type | Pulse width time tBurst (us) | Pulse period tRepeat (us) | Candidate ratio R | Second predetermined period number Np2 |
| --- | --- | --- | --- | --- |
| Type 1 | 1.02 | 10.667 | 10.40625 | 7200 |
| Type 2 | 1.02 | 10 | 9.8125 | 6750 |
| Type 3 | 1.02 | 10.28 | 10 | 7317 |
| Type 4 | 1.02 | 11 | 10.8125 | 7425 |

Please note that, in order to more clearly describe the spirit of the present invention, the predetermined frequency Fp of the target oscillating signal Sosc_tar in this embodiment is selected as 24 MHz, the frequency of the synthesized oscillating signal Ssyn is selected as 45 MHz, and the host type of the USB host 112 is categorized into one of the above four types, wherein N=15 (i.e., the second predetermined period number N_mp2 is a period number of the synthesized oscillating signal Ssyn counted during a period that is 15 times the clock period Tp). However, this is not a limitation to the present invention.

Hence, when the determining circuit 7042 receives the low frequency clock signal Spsr, the determining circuit 7042 counts the period number N_mtburst of the synthesized oscillating signal Ssyn during the multi-fold pulse width time M*tBurst of the low frequency clock signal Spsr, and keeps adjusting the programmable circuit 106 until the period number N_mtburst of the synthesized oscillating signal Ssyn during the multi-fold pulse width time M*tBurst is equal to the first predetermined period number N_mp1. Please note that, in the present invention, the programmable circuit 106 may be adjusted directly by the determining circuit 7042 or adjusted through the adjusting circuit 7044, to thereby adjust the frequency of the synthesized oscillating signal Ssyn. Since each pulse width time tBurst of the low frequency clock signal Spsr is fixed, when the period number N_mtbusrt of the synthesized oscillating signal Ssyn during the multi-fold pulse width time M*tBurst is equal to the first predetermine period number N_mp1, the synthesized oscillating signal Ssyn will be an oscillating signal having a predetermined frequency, i.e., the coarsely-adjusted synthesized oscillating signal Ssyn_coarse. Please note that, in this embodiment, M is an integer equal to 3, and thus the first predetermined number N_mp1 is about 138.

The frequency of the coarsely-adjusted synthesized oscillating signal Ssyn_coarse generated by the frequency synthesizer 7046 is about 45 MHz, and the determining circuit 7042 calculates the period number N_mtrepeat of the coarsely-adjusted synthesized oscillating signal Ssyn_coarse during the multi-fold pulse period M*tRepeat of the low frequency clock signal Spsr. Then, the determining circuit 7042 may calculate the ratio of the period number N_mtrepeat and the period number N_mtburst (i.e., N_mtrepeat/N_mtburst), so as to obtain the ratio R of the multi-fold period number M*tRepeat and the multi-fold period number M*tBurst (i.e., M*tRepeat/M*tBurst). Next, the determining circuit 7042 refers to the ratio R to obtain the corresponding host type through Table 3.

When the host type of the USB host 112 is determined, this means that the pulse period tRepeat of the low frequency clock signal Spsr generated by USB host 112, i.e., the specific clock period Tp, can be determined by utilizing Table 3. Then, the adjusting circuit 7044 counts the period number Nosc1 of the synthesized oscillating signal Ssyn (which is the coarsely-adjusted synthesized oscillating signal Ssyn_coarse in the beginning) during the multi-fold clock period (i.e., N*Tp) corresponding to the specific clock period Tp, and determines whether the period number Nosc1 is equal to the second predetermined period number N_mp2. Then, the adjusting circuit 7044 keeps adjusting the programmable oscillator 106, until the period number Nosc1 of the synthesized oscillating signal Ssyn is equal to the second predetermined period number N_mp2. Please note that, when the host type is determined, the specific clock period Tp thereof is a fixed period (e.g., the pulse period tRepeat of the host type Type 1 that is 10.667 μs). Hence, when the period number Nosc1 of the synthesized oscillating signal Ssyn is equal to the second predetermined period number N_mp2, the synthesized oscillating signal Ssyn will be an oscillating signal having a predetermined frequency, i.e., 45 MHz. In other words, at this moment, the corresponding oscillating signal Sosc is exactly the required target oscillating signal Sosc_tar with the desired frequency (i.e., 24 MHz).

Figure 8:
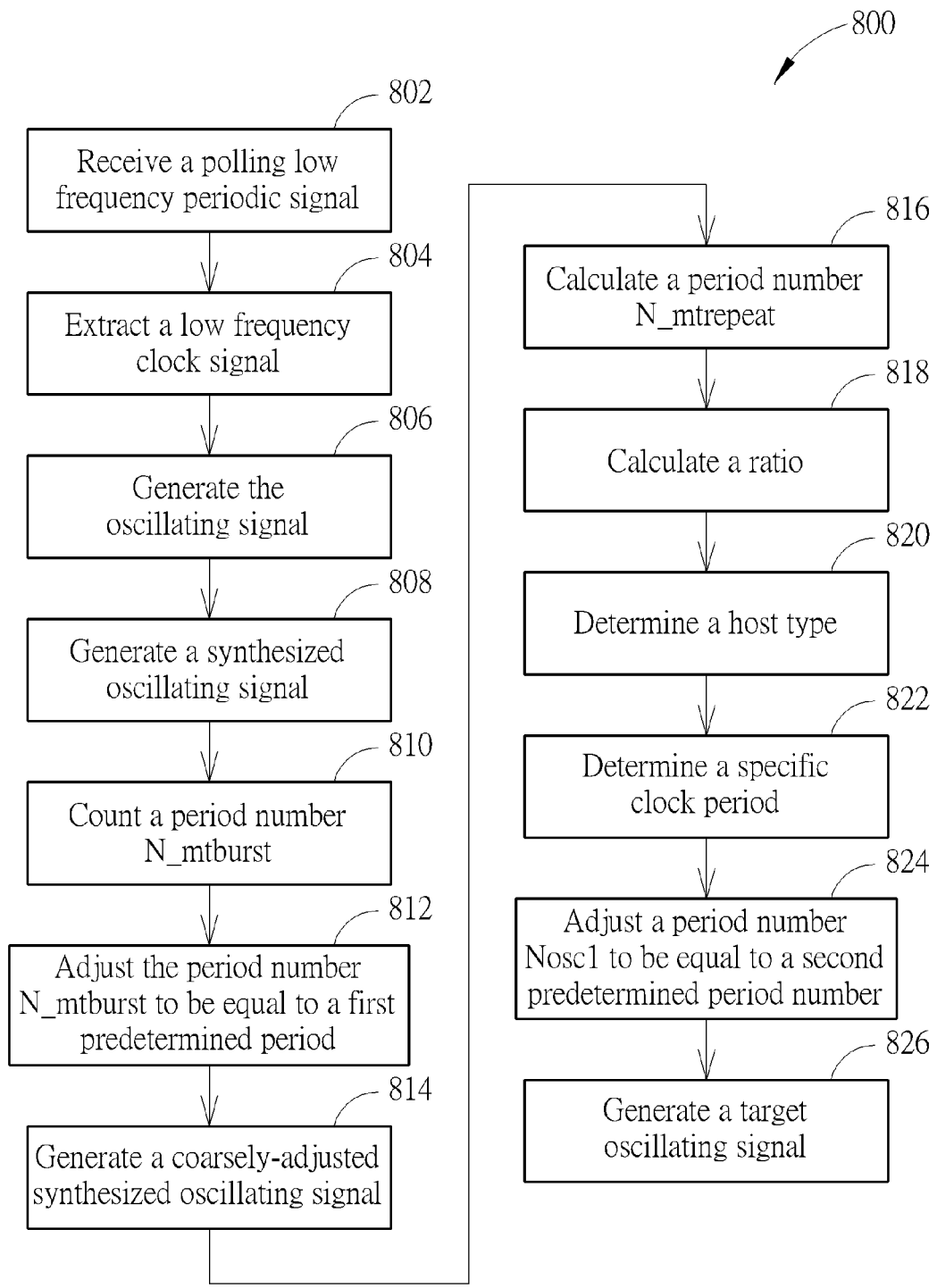
FIG. 8 is a frequency calibration method according to a second embodiment of the present invention.

In short, the operation procedure of the control circuit 104 shown in FIG. 7 may be represented by the flowchart shown in FIG. 8. Please refer to FIG. 8, which is a frequency calibration method 800 according to a second embodiment of the present invention. Provided that the result is substantially the same, the steps are not required to be executed in the exact order shown in FIG. 8. That is, other steps may be inserted into the steps in FIG. 8. The method 800 includes the following steps.

Step 802: Receive a polling low frequency periodic signal Sps from the USB host 112.

Step 804: Extract a low frequency clock signal Spsr corresponding to the polling low frequency periodic signal Sps.

Step 806: Control the programmable circuit 106 to generate the oscillating signal Sosc.

Step 808: Perform a frequency synthesis operation upon the oscillating signal Sosc to generate a synthesized oscillating signal Ssyn.

Step 810: Count the period number N_mtburst of the synthesized oscillating signal Ssyn during a multi-fold pulse width time M*tBurst of the low frequency clock signal Spsr.

Step 812: Keep adjusting the programmable circuit 106 until the period number N_mtburst of the synthesized oscillating signal Ssyn is equal to the first predetermined period N_mp1.

Step 814: Treat the synthesized oscillating signal Ssyn corresponding to the first predetermined period number N_mp1 as a coarsely-adjusted synthesized oscillating signal Ssyn_coarse.

Step 816: Calculate the period number N_mtrepeat of the coarsely-adjusted synthesized oscillating signal Ssyn_coarse during the multi-fold pulse period M*tRepeat of the low frequency clock signal Spsr.

Step 818: Calculate the ratio R of the multi-fold pulse period M*tRepeat and the multi-fold pulse width time M*tBurst.

Step 820: Determine the host type of the USB host 112 according to the ratio R.

Step 822: Determine a specific clock period Tp of the USB host 112 according to the host type of the USB host 112.

Step 824: Count the period number Nosc1 of the synthesized oscillating signal Ssyn during the multi-fold clock period N*Tp that is N times the specific clock period Tp, and keep adjusting the programmable oscillator 106 until the period number Nosc1 of the synthesized oscillating signal Ssyn is equal to the second predetermined period number N_mp2.

Step 826: Treat the oscillating signal Sosc corresponding to the second predetermined number N_mp2 as the target oscillating signal Sosc_tar.

Please note that, when the control circuit 104 calibrates the programmable circuit 106 to generate a precise target oscillating signal Sosc_tar, the control circuit 104 stores the corresponding control word Sc. After that, if the USB device 100 is coupled to the USB host 112 again, the control circuit 104 will no longer need to calibrate the programmable circuit 106, and may directly read the stored control word Sc. In this way, the USB device 100 of the present invention is capable of generating a reference clock having a precise frequency in a low-cost manner.

In conclusion, when the USB host 112 performs polling on the USB device 100, the device and method proposed by the present invention intentionally delay the time of the USB host 112 performing polling on the USB device 100, thus allowing the USB device 100 to extract the detected oscillating signal Spsr having the same frequency as that of the polling low frequency periodic signal Sps, and utilize the detected oscillating signal Spsr to calibrate the programmable oscillator 106. Hence, the present invention may generate a reference clock having a precise frequency without the need of a built-in precise inductor capacitor oscillator (LC oscillator). Hence, the cost of the USB device 100 of the present invention is lower than that of traditional designs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A frequency calibration method applicable in a Universal Serial Bus (USB) device, the frequency calibration method comprising:
coupling the USB device to a USB host;
utilizing the USB device to receive a polling low frequency periodic signal from the USB host;
determining a host type of the USB host according to the polling low frequency periodic signal; and
calibrating a programmable oscillator of the USB device according to a specific clock period corresponding to the host type, to make the programmable oscillator generate a target oscillating signal having a predetermined frequency;
wherein the step of determining the host type of the USB host according to the polling low frequency periodic signal comprises:
extracting a low frequency clock signal corresponding to the polling low frequency periodic signal;
controlling the programmable oscillator to generate an oscillating signal;
adjusting the oscillating signal of the programmable oscillator to serve as a coarsely-adjusted oscillating signal according to a pulse width time of the low frequency clock signal;

utilizing the coarsely-adjusted oscillating signal of the programmable oscillator to calculate a pulse period of the low frequency clock signal;
calculating a ratio of the pulse period and the pulse width time; and
determining the host type of the USB host according to the ratio.

2. The frequency calibration method of claim 1, further comprising:
when the USB device receives the polling low frequency periodic signal from the USB host, controlling the USB device to stop generating another polling low frequency periodic signal to the USB host, thus making the USB host continuously generate the polling low frequency periodic signal to the USB device.

3. The frequency calibration method of claim 1, wherein the pulse width time of the low frequency clock signal is substantially equal to a pulse width time of the polling low frequency periodic signal plus a predetermined delay time.

4. The frequency calibration method of claim 1, wherein the step of adjusting the oscillating signal of the programmable oscillator to serve as the coarsely-adjusted oscillating signal according to the pulse width time of the low frequency clock signal comprises:
counting a period number of the oscillating signal during the pulse width time of the low frequency clock signal, and determining whether the period number is equal to a predetermined period number;
keeping adjusting the programmable oscillator until the period number of the oscillating signal is equal to the predetermined period number; and
treating the oscillating signal corresponding to the predetermined period number as the coarsely-adjusted oscillating signal.

5. The frequency calibration method of claim 1, wherein the step of utilizing the coarsely-adjusted oscillating signal of the programmable oscillator to calculate the pulse period of the low frequency clock signal comprises:
counting a period number of the coarsely-adjusted oscillating signal during the pulse period of the low frequency clock signal;
wherein the period number of the coarsely-adjusted oscillating signal corresponds to the pulse period of the low frequency clock signal.

6. The frequency calibration method of claim 1, wherein the step of determining the host type of the USB host according to the ratio comprises:
utilizing a table to store a plurality of candidate host types and a plurality of candidate ratios corresponding to the plurality of candidate host types, respectively; and
comparing the plurality of candidate ratios with the ratio to determine the host type of the USB host from the plurality of candidate host types.

7. A frequency calibration method applicable in a Universal Serial Bus (USB) device, the frequency calibration method comprising:
coupling the USB device to a USB host;
utilizing the USB device to receive a polling low frequency periodic signal from the USB host;
determining a host type of the USB host according to the polling low frequency periodic signal; and
calibrating a programmable oscillator of the USB device according to a specific clock period corresponding to the host type, to make the programmable oscillator generate a target oscillating signal having a predetermined frequency;
wherein the step of calibrating the programmable oscillator of the USB device according to the specific clock period corresponding to the host type to make the programmable oscillator generate the target oscillating signal having the predetermined frequency comprises:
utilizing a table to store a plurality of candidate host types and a plurality of candidate clock periods corresponding to the plurality of candidate host types, respectively;
determining the specific clock period of the USB host from the plurality of candidate clock periods according to the host type;
counting a period number of an oscillating signal of the programmable oscillator during the specific clock period, and determining whether the period number is equal to a predetermined period number;
keeping adjusting the programmable oscillator until the period number of the oscillating signal is equal to the predetermined period number; and
treating the oscillating signal corresponding to the predetermined period number as the target oscillating signal.

8. A frequency calibration method applicable in a Universal Serial Bus (USB) device, the frequency calibration method comprising:
coupling the USB device to a USB host;
utilizing the USB device to receive a polling low frequency periodic signal from the USB host;
determining a host type of the USB host according to the polling low frequency periodic signal; and
calibrating a programmable oscillator of the USB device according to a specific clock period corresponding to the host type, to make the programmable oscillator generate a target oscillating signal having a predetermined frequency;
wherein the step of calibrating the programmable oscillator of the USB device to make the programmable oscillator to generate the target oscillating signal having the predetermined frequency according to the low frequency periodic signal corresponding to the polling low frequency periodic signal comprises:
utilizing a table to store a plurality of candidate host types and a plurality of candidate clock periods corresponding to the candidate host types, respectively;
determining the specific clock period of the USB host according to the host type, and calculating a multi-fold clock period that is multiple times the specific clock period;
counting a period number of an oscillating signal of the programmable oscillator during the multi-fold clock period, and determining whether the period number is equal to a predetermined period number;
keeping adjusting the programmable oscillator until the period number of the oscillating signal is equal to the predetermined period number; and
treating the oscillating signal corresponding to the predetermined period number as the target oscillating signal.

9. A frequency calibration method applicable in a Universal Serial Bus (USB) device, the frequency calibration method comprising:
coupling the USB device to a USB host;
utilizing the USB device to receive a polling low frequency periodic signal from the USB host;
determining a host type of the USB host according to the polling low frequency periodic signal; and
calibrating a programmable oscillator of the USB device according to a specific clock period corresponding to the host type, to make the programmable oscillator generate a target oscillating signal having a predetermined frequency;

wherein the step of determining the host type of the USB host according to the polling low frequency periodic signal comprises:

extracting a low frequency clock signal corresponding to the polling low frequency periodic signal;

controlling the programmable oscillator to generate an oscillating signal;

performing a frequency synthesizing operation upon the oscillating signal to generate a synthesized oscillating signal;

adjusting the oscillating signal according to a multi-fold pulse width time that is multiple times a pulse width time of the low frequency clock signal, to adjust the synthesized oscillating signal to serve as a coarsely-adjusted synthesized oscillating signal;

utilizing the coarsely-adjusted synthesized oscillating signal to calculate a multi-fold pulse period that is multiple times a pulse period of the low frequency clock signal;

calculating a ratio of the multi-fold pulse period and the multi-fold pulse width time; and determining the host type of the USB host according to the ratio.

10. The frequency calibration method of claim 9, wherein each pulse width time in the multi-fold pulse width time of the low frequency clock signal is substantially equal to a pulse width time of the polling low frequency periodic signal plus a predetermined delay time.

11. The frequency calibration method of claim 9, wherein the step of adjusting the oscillating signal according to the multi-fold pulse width time of the low frequency clock signal to adjust the synthesized oscillating signal to serve as the coarsely-adjusted synthesized oscillating signal comprises:

counting a period number of the synthesized oscillating signal during the multi-fold pulse width time of the low frequency clock signal, and determining whether the period number is equal to a predetermined period number;

adjusting the programmable oscillator unit the period number of the synthesized oscillating signal is equal to the predetermined period number; and treating the synthesized oscillating signal corresponding to the predetermined period number as the coarsely-adjusted synthesized oscillating signal.

12. The frequency calibration method of claim 9, wherein the step of utilizing the coarsely-adjusted synthesized oscillating signal to calculate the multi-fold pulse period of the low frequency clock signal comprises:

counting a period number of the coarsely-adjusted synthesized oscillating signal during the multi-fold pulse period of the low frequency clock signal;

wherein the period number of the coarsely-adjusted synthesized oscillating signal corresponds to the multi-fold pulse period of the low frequency clock signal.

13. The frequency calibration method of claim 9, wherein the step of determining the host type of the USB host according to the ratio comprises:

utilizing a table to store a plurality of candidate host types and a plurality of candidate ratios corresponding to the candidate host types, respectively; and comparing the plurality of candidate ratios with the ratio to determine the host type of the USB host from the plurality of candidate host types.

14. The frequency calibration method of claim 9, wherein the step of calibrating the programmable oscillator of the USB device according to the specific clock period corresponding to the host type, to make the programmable oscillator generate the target oscillating signal having the predetermined frequency comprises:

utilizing a table to store a plurality of candidate host types and a plurality of candidate clock periods corresponding to the candidate host types, respectively;

determining the specific clock period of the USB host from the plurality of candidate clock periods according to the host type, and counting a multi-fold clock period that is multiple times the specific clock period;

counting a period number of the synthesized oscillating signal during the multi-fold clock period, and determining whether the period number is equal to a predetermined period number;

keep adjusting the programmable oscillator until the period number of the synthesized oscillating signal is equal to the predetermined period number; and treating the oscillating signal corresponding to the predetermined period number as the target oscillating signal.

15. A Universal Serial Bus (USB) device, comprising:

a detection circuit, arranged for receiving a polling low frequency periodic signal generated from a USB host;

a determining circuit, coupled to the detection circuit, the determining circuit arranged for determining a host type of the USB host according to the polling low frequency periodic signal;

a programmable oscillator, arranged for generating an oscillating signal; and an adjusting circuit, coupled to the detection circuit, the determining circuit and the programmable oscillator, the adjusting circuit arranged for calibrating the programmable oscillator according to a specific clock period corresponding to the host type, to make the programmable oscillator generate a target oscillating signal having a predetermined frequency;

wherein the detection circuit further extracts a low frequency clock signal corresponding to the polling low frequency periodic signal, and the determining circuit is arranged for: adjusting the oscillating signal of the programmable oscillator to serve as a coarsely-adjusted oscillating signal according to a pulse width time of the low frequency clock signal; utilizing the coarsely-adjusted oscillating signal of the programmable oscillator to calculate a pulse period of the low frequency clock signal; calculating a ratio of the pulse period and the pulse width time; and determining the host type of the USB host according to the ratio.

16. The USB device of claim 15, further comprising:

a transmission circuit, coupled to the adjusting circuit;

wherein when the USB device receives the polling low frequency periodic signal from the USB host, the adjusting circuit further controls the transmission circuit to stop generating another polling low frequency periodic signal to the USB host, thus making the USB host continuously generate the polling low frequency periodic signal to the USB device.

17. The USB device of claim 15, wherein the pulse width time of the low frequency clock signal is substantially equal to a pulse width time of the polling low frequency periodic signal plus a predetermined delay time.

18. The USB device of claim 15, wherein the determining circuit is arranged for: counting a period number of the oscillating signal during the pulse width time of the low frequency clock signal, and determining whether the period number is equal to a predetermined period number; keep adjusting the programmable oscillator until the period number of the oscillating signal is equal to the predetermined period number; and treating the oscillating signal corresponding to the predetermined period number as the coarsely-adjusted oscillating signal.

19. The USB device of claim 15, wherein the determining circuit is arranged for counting a period number of the coarsely-adjusted oscillating signal during the pulse period of the low frequency clock signal; and the period number of the coarsely-adjusted oscillating signal corresponds to the pulse period of the low frequency clock signal.

20. The USB device of claim 15, further comprising:
a table, arranged for storing a plurality of candidate host types and a plurality of candidate ratios corresponding to the plurality of candidate host types, respectively;
wherein the determining circuit compares the plurality of candidate ratio with the ratio to determine the host type of the USB host from the plurality of candidate host types.

21. A Universal Serial Bus (USB) device, comprising:
a detection circuit, arranged for receiving a polling low frequency periodic signal generated from a USB host;
a determining circuit, coupled to the detection circuit, the determining circuit arranged for determining a host type of the USB host according to the polling low frequency periodic signal;
a programmable oscillator, arranged for generating an oscillating signal;
an adjusting circuit, coupled to the detection circuit, the determining circuit and the programmable oscillator, the adjusting circuit arranged for calibrating the programmable oscillator according to a specific clock period corresponding to the host type, to make the programmable oscillator generate a target oscillating signal having a predetermined frequency; and
a table, arranged for storing a plurality of candidate host types and a plurality of candidate clock periods corresponding to the plurality of candidate host types, respectively;
wherein the adjusting circuit is arranged for: determining the specific clock period corresponding to the USB host from the candidate clock periods according to the host type; counting a period number of an oscillating signal of the programmable oscillator during the specific clock period and determining whether the period number is equal to a predetermined period number; keeping adjusting the programmable oscillator until the period number of the oscillating signal is equal to the predetermined period number; and treating the oscillating signal corresponding to the predetermined period number as the target oscillating signal.

22. A Universal Serial Bus (USB) device, comprising:
a detection circuit, arranged for receiving a polling low frequency periodic signal generated from a USB host;
a determining circuit, coupled to the detection circuit, the determining circuit arranged for determining a host type of the USB host according to the polling low frequency periodic signal;
a programmable oscillator, arranged for generating an oscillating signal;
an adjusting circuit, coupled to the detection circuit, the determining circuit and the programmable oscillator, the adjusting circuit arranged for calibrating the programmable oscillator according to a specific clock period corresponding to the host type, to make the programmable oscillator generate a target oscillating signal having a predetermined frequency; and
a table, arranged for storing a plurality of candidate host types and a plurality of candidate clock periods corresponding to the candidate host types, respectively;
wherein the adjusting circuit is arranged for: determining the specific clock period of the USB host from the candidate clock periods according to the host type and counting a multi-fold clock period that is multiple times the specific clock period; counting a period number of an oscillating signal of the programmable oscillator during the multi-fold clock period, and determining whether the period number is equal to a predetermined period number; keeping adjusting the programmable oscillator until the period number of the oscillating signal is equal to the predetermined period number; and treating the oscillating signal corresponding to the predetermined period number as the target oscillating signal.

23. A Universal Serial Bus (USB) device, comprising:
a detection circuit, arranged for receiving a polling low frequency periodic signal generated from a USB host;
a determining circuit, coupled to the detection circuit, the determining circuit arranged for determining a host type of the USB host according to the polling low frequency periodic signal;
a programmable oscillator, arranged for generating an oscillating signal;
an adjusting circuit, coupled to the detection circuit, the determining circuit and the programmable oscillator, the adjusting circuit arranged for calibrating the programmable oscillator according to a specific clock period corresponding to the host type, to make the programmable oscillator generate a target oscillating signal having a predetermined frequency; and
a frequency synthesizer, arranged for performing a frequency synthesizing operation upon the oscillating signal to generate a synthesized oscillating signal;
wherein the detection circuit further extracts a low frequency clock signal corresponding to the polling low frequency periodic signal, and the determining circuit is arranged for: adjusting the oscillating signal according to a multi-fold pulse width time that is multiple times a pulse width time of the low frequency clock signal, to adjust the synthesized oscillating signal to serve as a coarsely-adjusted synthesized oscillating signal; utilizing the coarsely-adjusted synthesized oscillating signal to calculate a multi-fold pulse period that is multiple times of a pulse period of the low frequency clock signal; calculating a ratio of the multi-fold pulse period and the multi-fold pulse width time; and determining the host type of the USB host according to the ratio.

24. The USB device of claim 23, wherein each pulse width time in the multi-fold pulse width time of the low frequency clock signal is substantially equal to a pulse width time of the polling low frequency periodic signal plus a predetermined delay time.

25. The USB device of claim 23, wherein the determining circuit is arranged for: counting a period number of the synthesized oscillating signal during the multi-fold pulse width time of the low frequency clock signal, and determining whether the period number is equal to a predetermined period number; adjusting the programmable oscillator unit the period number of the synthesized oscillating signal is equal to the predetermined period number; and treating the synthesized oscillating signal corresponding to the predetermined period number as the coarsely-adjusted synthesized oscillating signal.

26. The USB device of claim 23, wherein the determining circuit is arranged to count a period number of the coarsely-adjusted synthesized oscillating signal during the multi-fold pulse period of the low frequency clock signal; and the period number of the coarsely-adjusted synthesized oscillating signal corresponds to the multi-fold pulse period of the low frequency clock signal.

27. The USB device of claim 23, further comprising:
a table, arranged for storing a plurality of candidate host types and a plurality of candidate ratios corresponding to the candidate host types, respectively;
wherein the determining circuit is arranged to compare the plurality of candidate ratios with the ratio to determine the host type of the USB host from the plurality of candidate host types.

28. The USB device of claim 23, further comprising:
a table, arranged for storing a plurality of candidate host types and a plurality of candidate clock periods corresponding to the candidate host types, respectively;
wherein the adjusting circuit is arranged for: determining the specific clock period of the USB host from the plurality of candidate clock periods according to the host type; counting a period number of the synthesized oscillating signal of the programmable oscillator during a multi-fold clock period that is multiple times the specific clock period, and determining whether the period number is equal to a predetermined period number; keeping adjusting the programmable oscillator until the period number of the synthesized oscillating signal is equal to the predetermined period number; and treating the oscillating signal corresponding to the predetermined period number as the target oscillating signal.

* * * * *